UNITED STATES PATENT OFFICE.

HENRY A. WEBER AND MELVILL A. SCOVELL, OF URBANA, ILLINOIS.

PROCESS OF MANUFACTURING SUGAR AND SIRUP.

SPECIFICATION forming part of Letters Patent No. 250,118, dated November 29, 1881.

Application filed October 10, 1881. (Specimens.)

*To all whom it may concern:*

Be it known that we, HENRY A. WEBER and MELVILL A. SCOVELL, citizens of the United States, and residents of the city of Urbana, county of Champaign, and State of Illinois, have invented certain new and useful Improvements in the Processes used in the Manufacture of Sugar and Sirup from Sorghum-Cane; and we do hereby declare that the following is a clear and exact description of the invention, which will enable others skilled in the art to which it appertains to make and use the same.

Heretofore sugar made from sorghum-cane has had the objectionable odor and taste of the sorghum. By our process these objections are entirely removed, and good marketable sugar and sirup are readily obtained. Sorghum-juice in its normal condition is acid, and contains both cane-sugar and grape-sugar in varying quantities. Cane-sugar, as is well known, is readily converted into grape-sugar on application of heat in the presence of any acid; hence, in the ordinary method of treating the juice, without neutralization, so much of the cane-sugar is inverted during the process of evaporation that the production of crystallizable sugar is no longer profitable. When, for the purpose of neutralization, lime is added in excess, as is sometimes done, the defecation is very imperfect, the sirup obtained dark, and the taste of the sugar and molasses objectionable. In our process all of these difficulties are entirely removed.

The juice of the sorghum-cane is first treated with excess of calcium carbonate. It is next heated to boiling and thoroughly defecated, the scum arising being removed. The calcium carbonate may be added, however, after the boiling has begun; but better results have been obtained by us by making this addition when the juice is cold. After thorough defecation the juice is passed through bone-black filters, constructed in any approved form, and finally evaporated to crystallization.

In place of calcium carbonate, milk of lime may be used; but in this case the addition must be stopped when the juice is exactly neutralized. This point may be determined with a sufficient degree of accuracy for all practical purposes by observing when the juice under treatment slowly turns red litmus-paper blue.

The advantages of exact neutralization are, first, that the juice may be afterward more easily and thoroughly defecated, and, second, that the bone-black filters, which are quickly rendered useless when lime is used in excess, may be used for a great length of time. The further advantage of our process is that sugar and sirup may be made from the juice of the sorghum-cane so easily and rapidly that their manufacture is more profitable than heretofore, for the reason that by the old processes so much time was consumed. Time is an important factor in the making of sugar from sorghum-cane, two months being the limit of time during which successful operations can be carried on.

We are aware that the juice of the sugar-cane and some other vegetable juices have been refined by the use of a mixture of calcium carbonate with sulphate of alumina and silex and of calcium carbonate with peroxide of manganese; also, that calcium carbonate has been used in the refining of sirups and of raw sugars.

We are also aware that lime has been used in neutralizing the juice of sorghum-cane; but when so used other chemicals or ingredients, as sulphurous acid, carbonic acid, tannin, alum, phosphates, sulphite of lime, &c., have been added subsequently; but we are not aware that calcium carbonate alone has ever been used to neutralize the juice of sorghum-cane; nor are we aware that the juice of the sorghum-cane has ever been exactly neutralized and defecated simply and directly by the use of lime with subsequent boiling. We do not, therefore, claim any of those processes described as heretofore used; but, Having fully described our invention, we claim—

1. The process hereinbefore described of neutralizing the juice of sorghum-cane, which consists of the addition of calcium carbonate to the juice.

2. The process hereinbefore described of purifying and refining the juice of sorghum-cane, which consists of the addition of calcium carbonate to the juice, then boiling and defecating, and filtering through bone-black filters.

3. The process hereinbefore set forth of purifying and refining the juice of sorghum-cane, which consists of the addition of lime to the juice in quantities sufficient to exactly neutralize it, then boiling and defecating the same, and filtering through bone-black filters.

4. The manufacture of sugar and sirup from sorghum-cane by the process hereinbefore described, consisting of first neutralizing the juice by the addition of calcium carbonate; second, boiling and defecating the same; third, filtering through bone-black filters; and, finally, evaporating to crystallization.

5. The manufacture of sugar and sirup from sorghum-cane by the process hereinbefore set forth, which consists, first, of the addition to the juice of lime in sufficient quantity to exactly neutralize the same; second, boiling and defecation; third, filtering through bone-black and evaporating to crystallization.

6. The manufacture of sugar and sirup from sorghum-cane by means of the process of exact neutralization of the expressed juice of the cane by carbonate of lime or milk of lime, or both, and the purification of the juice after neutralization and defecation by the use of bone-black filters.

HENRY A. WEBER.
MELVILL A. SCOVELL.

Witnesses:
H. B. SLAUSON,
C. C. BARNES.